United States Patent Office 3,706,820
Patented Dec. 19, 1972

3,706,820
S-ALKYLMERCAPTOMETHYLTHIOPHOSPHORIC
OR PHOSPHONIC ACID ESTERS
Hellmut Hoffmann, Wuppertal-Elberfeld, and Ingeborg Hammann, Cologne, Germany, assignors to Bayer Aktiengesellschaft, Leverkusen, Germany
No Drawing. Filed Mar. 4, 1971, Ser. No. 121,190
Claims priority, application Germany, Mar. 7, 1970, P 20 10 889.8
Int. Cl. C07f 9/24; A01n 9/36
U.S. Cl. 260—940
6 Claims

ABSTRACT OF THE DISCLOSURE

S-alkylmercaptomethyl-thio- or -dithio-phosphoric or -phosphonic acid esters of the general formula:

$$H_3C-\underset{\underset{CN}{|}}{\overset{CH_2Cl}{|}}{C}-S-CH_2-S-\overset{X}{\underset{R_1}{\overset{\|}{P}}}\diagdown^{OR} \quad (I)$$

in which:
R is a lower alkyl radical,
$R_1$ is a lower alkyl or alkoxy radical, and
X is an oxygen or sulfur atom,
to a process for their preparation and to their use as insecticides or acaricides.

The present invention relates to and has for its objects the provision of particular new S-alkylmercaptomethyl-thio- or dithio-phosphoric or phosphonic acid esters, i.e. O,O-di-lower alkyl-S[(1-cyano-1-chloromethyl)-ethylmercapto]-methylthio- or dithio-phosphoric acid esters or O-lower alkyl-S-[(1-cyano-1-chloromethyl)-ethylmercapto]-methyl -lower alkane thio- or dithio-phosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g. arthropods, especially insects and acarids, with other and further objects becoming apparent from a study of the within specification and accompanying examples.

In German Auslegeschrift (Published Specification) 1,187,607, there are described S-[2-chloroethylmercaptomethyl]-thio- or -dithio-phosphoric (-phosphonic, -phosphinic) acid esters which exhibit pesticidal, in particular insecticidal, activity.

Furthermore, from German patent specification 1,196,- 188, S - (β - cyanoethylmercaptomethyl)-thio- or -dithio-phosphoric (-phosphonic, -phosphinic) acid esters are known which are distinguished by a pesticidal, in particular insecticidal, effectiveness, especially against aphids and spider mites.

The present invention provides S-alkylmercaptomethyl-thio- or -dithio-phosphoric or -phosphonic acid esters of the general formula:

$$H_3C-\underset{\underset{CN}{|}}{\overset{CH_2Cl}{|}}{C}-S-CH_2-S-\overset{X}{\underset{R_1}{\overset{\|}{P}}}\diagdown^{OR} \quad (I)$$

in which
R is a lower alkyl radical,
$R_1$ is a lower alkyl or alkoxy radical, and
X is an oxygen or sulfur atom.
These compounds have surprisingly been found to exhibit a strong insecticidal and acaricidal effectiveness.

The invention also provides a process for the production of a S-alkylmercaptomethyl-thio- or -dithio-phosphoric or -phosphonic acid ester of the Formula (I) in which a thio- or dithio-phosphoric or -phosphonic acid salt of the general formula:

$$\underset{R_1}{\overset{RO}{\diagdown}}\overset{X}{\underset{}{\overset{\|}{P}}}-S-M \quad (II)$$

in which:
R, $R_1$ and X have the meanings stated above, and
M is an alkali metal equivalent, alkaline earth metal equivalent or ammonium equivalent, is reacted with 1-chloromethylmercapto - 2 - chloroisopropylcyanide of the formula:

$$\underset{\underset{S-CH_2-Cl}{|}}{\overset{CH_3}{|}}NC-C-CH_2-Cl \quad (III)$$

Surprisingly, the S-alkylmercaptomethyl-thio- or -dithio-phosphoric or -phosphonic acid esters according to the invention possess a substantially better insecticidal and acaricidal effectiveness than the known S-[2-chloroethylmercaptomethyl]-thio- or -dithio-phosphoric (-phosphonic, -phosphinic) acid esters of analogous constitution and the same direction of activity. The substances according to the invention therefore represent a genuine enrichment of the art.

If sodium O,O - diethyldithiophosphate and 1 - chloromethylmercapto - 2 - chloroisopropylcyanide are used as starting material, the reaction course can be represented by the following formula scheme:

$$(C_2H_5O)_2\overset{S}{\underset{}{\overset{\|}{P}}}-S\,Na\;+\;Cl-CH_2-\underset{\underset{CH_3}{|}}{\overset{S\,CH_2Cl}{|}}{C}-CN\;\xrightarrow{-NaCl}$$

IIa) \hspace{2cm} (III)

$$(C_2H_5O)_2\overset{S}{\underset{}{\overset{\|}{P}}}-S-CH_2S-\underset{\underset{CH_3}{|}}{\overset{CH_2Cl}{|}}{C}-CN \quad (IV)$$
(I)

The starting materials to be used are unambiguously defined generally by the Formulae II and III.
Preferably, R and $R_1$ are alkyl or alkoxy radicals with 1 to 4 and especially 1 or 2 carbon atoms each, and M is a sodium atom.

As examples of thio- or dithio-phosphoric (-phosphonic) acid salts which can be used, there may be listed the following: The salts of O,O-dimethyl-, O,O-diethyl-, O,O-diisopropyl-, O,O-dipropyl-, O-methyl-O-ethyl-, O-ethyl-O-isopropyl- and O-ethyl-O-propyl(thiono)thiolphosphoric acid esters; further, the salts of O,P-dimethyl-O-P-diethyl-, O-methyl-P-ethyl-, O-methyl-P-propyl-, O-ethyl-P-methyl-, O-ethyl-P-propyl-, O-iso-propyl-P-ethyl and O,P-diiso-propylthiolphosphonic acid esters or their thiono analogues.

The thio- or dithiophosphoric or -phosphonic acid salts to be used as starting materials are described in the literature and can, like the acetonitrile derivative of the Formula III, be prepared according to methods known per se.

The reaction is preferably carried out in the presence of a solvent which term includes a mere diluent. As such, all inert organic solvents are suitable. These include, in particular, aliphatic and aromatic (possibly substituted) chlorinated hydrocarbons, such as benzene, toluene, xylene, benzine, methylene chloride, chloroform, carbon tetrachloride and chlorobenzene; ethers, such as diethyl and dibutyl ether and dioxane; ketones, such as acetone, methyl ethyl ketone, methylisopropyl ketone and methylisobutyl ketone; and nitriles, such as acetonitrile.

The reaction temperatures can be varied within a fairly wide range. In general, the reaction is carried out at about 50 to 150, preferably about 70 to 80° C.

The reaction is, in general, carried out at normal pressure.

In the process, the starting materials are in most cases used in equimolar proportion. An excess of one or the other of the reaction components brings no substantial advantages.

The reaction is generally carried out in one of the above-mentioned solvents at the temperatures stated. After stirring of the mixture for one to several hours, optionally at elevated temperature, the mixture may be poured into water, extracted with benzene and worked up according to customary methods.

The substances according to the invention are obtained in most cases in the form of colorless to slightly yellow-colored, viscous water-insoluble oils which cannot be distilled without decomposition but which can, by so-called "slight distillation" (that is, by prolonged heating at moderately elevated temperatures under reduced pressure), be freed from the last volatile components and in this way they can be purified. The refractive index is particularly useful for characterizing the compounds.

As already mentioned above, the compounds of the invention are distinguished by an outstanding insecticidal and acaricidal effectiveness, for example against plant pests and hygiene pests. They possess a good activity against sucking as well as biting insects, and mites (Acarina). At the same time they exhibit a low phytotoxicity.

For these reasons, the compounds according to the invention are used with success as pesticides, above all in the hygiene field.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further cicada, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleptera), for example the granary weevil (*Sitophilus granarius=Calandra granaria*), the Colorado beetle (*Leptinoatarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius =Acanthosecilides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the norther house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Paratetranchus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the replapsing fever tick (*Ornithodorus moubata*).

When applied against hygiene pests and pests of stored products, particularly flies and mosquitoes, the compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble, powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (eg. dimethyl sulfoxide, etc.), ketones (e.g. acetone, etc.) and/or water; as well as inert dispersible finely divided solid carriers, such as ground natural minerals (e.g. kaolins, clays, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates overall compositions which comprise mixtures of a conventional dispersible carrier vehicles such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkyaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

TABLE 1.—PLUTELLA TEST

| Active compound | Concentration of active compound in percent | Degree of destruction in percent after 3 days |
|---|---|---|
| (A) $(CH_3O)_2\overset{S}{\overset{\|}{P}}-S-CH_2-S-CH_2-CH_2-CN$ (known) | 0.01 | 0 |
| (B) $(CH_3O)_2\overset{O}{\overset{\|}{P}}-S-CH_2-S-CH_2-CH_2-CN$ (known) | 0.01 | 0 |
| (C) $(C_2H_5O)_2\overset{S}{\overset{\|}{P}}-S-CH_2-S-CH_2-CH_2-CN$ (known) | 0.01 | 0 |
| (D) $(C_2H_5O)_2\overset{O}{\overset{\|}{P}}-S-CH_2-S-CH_2-CH_2-CN$ (known) | 0.01 | 50 |

TABLE 1.— Continued

| Active compound | | Concentration of active compound in percent | Degree of destruction in percent after 3 days |
|---|---|---|---|
| (E) | $CH_3O\!\!>\!\!\underset{CH_3}{\overset{S}{\overset{\|}{P}}}\!\!-\!\!S\!\!-\!\!CH_2\!\!-\!\!S\!\!-\!\!CH_2\!\!-\!\!CH_2\!\!-\!\!CN$ (known) | 0.01 | 0 |
| (1) | $(C_2H_5O)_2\overset{S}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.01<br>0.001 | 100<br>30 |
| (2) | $(C_2H_5O)_2\overset{O}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.01 | 100 |
| (3) | $\underset{C_2H_5O}{\overset{C_2H_5}{>}}\!\!\overset{S}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.01<br>0.001 | 100<br>100 |
| (4) | $(CH_3O)_2\overset{S}{\overset{\|}{P}}\!-\!S\!-\!CH_2\!-\!S\!-\!\underset{\underset{CN}{\|}}{\overset{\overset{CH_2-Cl}{\|}}{C}}\!-\!CH_3$ | 0.01 | 100 |

EXAMPLE 2

Myzus test (contact action)

Solvent: 3 parts by weight acetone
Emulsier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (Brassica oleracea) which have been heavily infested with peach aphids (Myzus persicae) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2.

TABLE 2.—MYZUS TEST

| Active compound | | Concentration of active compound in percent | Degree of destruction in percents after 24 hours |
|---|---|---|---|
| (A) | $(CH_3O)_2\overset{S}{\overset{\|}{P}}\!-\!S\!-\!CH_2\!-\!S\!-\!CH_2\!-\!CH_2\!-\!CN$ (known) | 0.1<br>0.01 | 100<br>0 |
| (B) | $(CH_3O)_2\overset{O}{\overset{\|}{P}}\!-\!S\!-\!CH_2\!-\!S\!-\!CH_2\!-\!CH_2\!-\!CN$ (known) | 0.1<br>0.01 | 100<br>40 |
| (1) | $(C_2H_5O)_2\overset{S}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.1<br>0.01<br>0.001<br>0.0001 | 100<br>100<br>99<br>90 |
| (2) | $(C_2H_5O)_2\overset{O}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.1<br>0.01<br>0.001<br>0.0001 | 100<br>100<br>95<br>35 |
| (3) | $\underset{C_2H_5O}{\overset{C_2H_5}{>}}\!\!\overset{S}{\overset{\|}{P}}\!-\!S\!-\!CH_2\!-\!S\!-\!\underset{\underset{CN}{\|}}{\overset{\overset{CH_3}{\|}}{C}}\!-\!CH_2\!-\!Cl$ | 0.1<br>0.01<br>0.001<br>0.0001 | 100<br>100<br>99<br>40 |
| (4) | $(CH_3O)_2\overset{S}{\overset{\|}{P}}\!-\!S\!-\!CH_2\!-\!S\!-\!\underset{\underset{CN}{\|}}{\overset{\overset{CH_2-Cl}{\|}}{C}}\!-\!CH_3$ | 0.1<br>0.01<br>0.001 | 100<br>100<br>95 |

EXAMPLE 3

Tetranychus test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (Phaseolus vulgaris), which have a height of approximately 10–30 cm., are sprayed with the preparation of the active compound until dripping wet. These bean plants are heavily infested with spider mites (Tetranychus urticae) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

| Compound | | Refractive index |
|---|---|---|
| (3) | $C_2H_5O\underset{C_2H_5}{\overset{S}{\diagup}}\!\!\!\!\!\!\!\overset{\|}{P}$—S—CH$_2$—S—$\underset{CN}{\overset{CH_2-Cl}{\overset{\|}{C}}}$—CH$_3$ | $n_D^{20}=1.5590$ |
| (2) | $(C_2H_5O)_2\overset{O}{\overset{\|}{P}}$—S—CH$_2$—S—$\underset{CN}{\overset{CH_2Cl}{\overset{\|}{C}}}$—CH$_3$ | $n_D^{21}=1.5082$ |
| (4) | $(CH_3O)_2\overset{S}{\overset{\|}{P}}$—S—CH$_2$—S—$\underset{CN}{\overset{CH_2Cl}{\overset{\|}{C}}}$—CH$_3$ | $n_D^{23}=1.5690$ |

EXAMPLE 6

The 1-chloromethylmercapto-2-chloro-isopropylcyanide of the formula $$\text{Cl}-\text{CH}_2-\underset{\underset{\text{CH}_3}{|}}{\overset{\overset{\text{S}-\text{CH}_2\text{Cl}}{|}}{\text{C}}}-\text{CN} \qquad \text{(III)}$$

TABLE 3.—TETRANYCHUS TEST

| Active compound | | Concentration of active compound in percent | Degree of destruction in percent after 48 hours |
|---|---|---|---|
| (1) | $(C_2H_5O)_2\overset{S}{\overset{\|}{P}}$—S—CH$_2$—S—$\underset{CN}{\overset{CH_3}{\overset{\|}{C}}}$—CH$_2$—Cl | 0.1<br>0.01<br>0.001 | 100<br>99<br>90 |
| (2) | $(C_2H_5O)_2\overset{O}{\overset{\|}{P}}$—S—CH$_2$—S—$\underset{CN}{\overset{CH_3}{\overset{\|}{C}}}$—CH$_2$—Cl | 0.1<br>0.01 | 100<br>90 |
| (3) | $\underset{C_2H_5O}{\overset{C_2H_5}{\diagdown}}\!\!\!\!\!\overset{S}{\overset{\|}{P}}$—S—CH$_2$—S—$\underset{CN}{\overset{CH_3}{\overset{\|}{C}}}$—CH$_2$—Cl | 0.1<br>0.01<br>0.001 | 100<br>100<br>100 |

The following further examples are set forth to illustrate, without limitation, the process for producing the active compounds according to the present invention.

EXAMPLE 4

$$(C_2H_5O)_2\overset{S}{\overset{\|}{P}}-S-CH_2-S-\underset{\underset{CN}{|}}{\overset{\overset{CH_2Cl}{|}}{C}}-CH_3 \qquad (1)$$

65 g. of sodium O,O-diethyldithiophosphate, dissolved in 250 ml. of acetonitrile, are stirred together with 55 g. of 1-chloromethylmercapto-2-chloroisopropylcyanide for one hour at 80° C. The mixture is then poured into water, taken up with benzene, the benzene phase is separated and dried, the solvent is evaporated and the residue is "slightly distilled." The yield of O,O-diethyl-S-[(1-cyano-1-chloromethyl)-ethylmercapto]-methyldithiophosphoric acid ester is 83% of the theory; the refractive index is $n_D^{22}=1.5450$.

Calculated for $C_9H_{17}O_2NClS_3P$ (molecular weight 334) (percent): N, 4.2; Cl, 10.6; S, 28.8; P, 9.3. Found (percent): N, 4.43; Cl, 10.74; S, 29.08; P, 8.99.

EXAMPLE 5

In analogous manner, the following compounds can be prepared:

required as starting material can be obtained for example as follows:

1st step:
$$\text{Cl}-\text{CH}_2-\underset{\underset{\text{CH}_3}{|}}{\overset{\overset{\text{S}-\text{CH}_3}{|}}{\text{C}}}-\text{CN} \qquad (V)$$

Preparation is effected according to "Journal of the American Chemical Society", 1968, page 2074 2nd step: 68 g. of sulfuryl chloride are added at 40° C. to 75 g. of 1-methylmercapto-2-chloro-isopropylcyanide (V) and 300 ml. of methylene chloride. The solvent is then drawn off and the residue is distilled. The product boils at 92° C./1 mm. Hg. The yield is 82 g. (89% of the theory), the refractive index is $n_D^{23}=1.5175$.

Calculated for $C_5H_7NCl_2S$ (molecular weight 184) (percent): N, 7.6; Cl, 38.6; S, 17.4. Found (percent): N, 7.29; Cl, 36.36; S. 17.7.

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

It will be appreciated that the instant specification and examples are set forth by way of illustration and not limitation, and that various modifications and changes may be made without departing from the spirit and scope of the present invention.

What is claimed is:

1. S-alkylmercaptomethylthio- or -dithio-phosphoric or -phosphonic acid esters of the general formula:

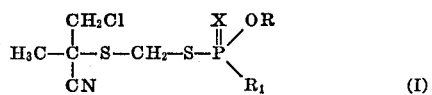

in which
R is a lower alkyl radical,
$R_1$ is a lower alkyl or alkoxy radical, and
X is an oxygen or sulfur atom.

2. Compounds according to claim 1 in which R and $R_1$ each contains 1 or 2 carbon atoms.

3. The compound according to claim 1 wherein such compound is O,O - diethyl-S-[(1-cyano-1-chloromethyl)-ethylmercapto]-methyldithiophosphoric acid ester having the formula:

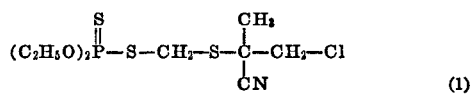

4. The compound according to claim 1 wherein such compound is O,O - diethyl-S-[(1 cyano-1-chloromethyl)-ethylmercapto]-methylthiolphosphoric acid ester having the formula:

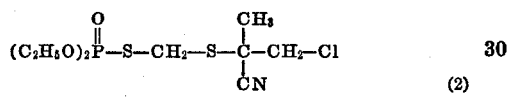

5. The compound according to claim 1 wherein such compound is O-ethyl-S-[(1-cyano-1-chloromethyl)-ethylmercapto]-methyl-ethanedithiophosphonic acid ester having the formula:

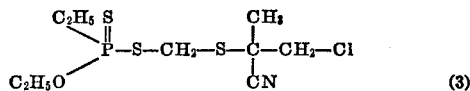

6. The compound according to claim 1 wherein such compound is O,O-dimethyl-S-[(1-cyano-1-chloromethyl)-ethylmercapto]-methyldithiophosphoric acid ester having the formula:

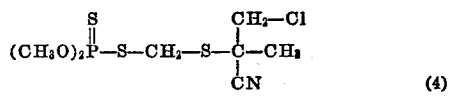

References Cited
UNITED STATES PATENTS 2,815,312 12/1957 Schuler _____ 260—940 X
2,908,604 10/1959 Godfrey et al. _____ 260—940 X LEWIS GOTTS, Primary Examiner
A. H. SUTTO, Assistant Examiner U.S. Cl. X.R.
260—465.7, 979; 424—210